US011674552B2

(12) United States Patent
McNichols et al.

(10) Patent No.: US 11,674,552 B2
(45) Date of Patent: *Jun. 13, 2023

(54) BEARING COMPRESSION STRAP

(71) Applicant: Insight Analytics Solutions Holdings Limited, Nottinghan (GB)

(72) Inventors: Colin McNichols, Lafayette, CO (US); Chad Phillip Glinsky, Boulder, CO (US); Ashley Crowther, Boulder, CO (US)

(73) Assignee: Insight Analytics Solutions Holdings Limited, Nottingham (GB)

(*) Notice: Subject to any disclaimer, the term of this patent is extended or adjusted under 35 U.S.C. 154(b) by 0 days.

This patent is subject to a terminal disclaimer.

(21) Appl. No.: 17/853,883

(22) Filed: Jun. 29, 2022

(65) Prior Publication Data

US 2022/0333651 A1 Oct. 20, 2022

Related U.S. Application Data

(63) Continuation of application No. 17/390,430, filed on Jul. 30, 2021, now Pat. No. 11,384,795, which is a (Continued)

(30) Foreign Application Priority Data

Jun. 30, 2016 (GB) ..................................... 1611353

(51) Int. Cl.
*F16C 41/00* (2006.01)
*F16C 41/02* (2006.01)
(Continued)

(52) U.S. Cl.
CPC ................ *F16C 41/02* (2013.01); *F16B 2/08* (2013.01); *F16C 19/522* (2013.01); *F16C 25/00* (2013.01);
(Continued)

(58) Field of Classification Search
CPC .......... F16B 2/08; F16B 2/065; F16C 19/522; F16C 2360/31; F16C 2360/25;
(Continued)

(56) References Cited

U.S. PATENT DOCUMENTS 2,746,107 A 5/1956 Mahn
3,065,007 A 11/1962 Colmer, Jr.
(Continued)

FOREIGN PATENT DOCUMENTS

CN 104541079 4/2015
CN 204344264 5/2015
(Continued)

OTHER PUBLICATIONS

Website: Post-Tensioning—Isle of Grain, LNG Tanks, Kent, Sep. 1, 2015, accessed and printed on Jul. 29, 2020 from https://freyssinet.co.uk/post-tensioning-isle-grain-lng-tanks-kent/.
(Continued)

*Primary Examiner* — Emmanuel M Marcelo
(74) *Attorney, Agent, or Firm* — McDonnell Boehnen Hulbert & Berghoff LLP

(57) ABSTRACT

A tensioning arrangement for a bearing ring, which introduces a compressive force towards a rotational centre of the bearing ring, to prevent the bearing ring distorting as a shaft supported by the bearing turns. The tensioner arrangement includes a strap and a tensioner. The strap has a connector at each end, and tensioner has an element for connecting to the connectors. The tensioner also has an element for applying tension to the strap. In use, the strap is arranged around the bearing ring and a circumferential length of the strap in contact with the bearing ring is reduced, thereby applying compressive force to the bearing ring.

16 Claims, 7 Drawing Sheets

Related U.S. Application Data continuation of application No. 17/090,546, filed on Nov. 5, 2020, now Pat. No. 11,384,794, which is a continuation of application No. 15/757,095, filed as application No. PCT/IB2016/055266 on Sep. 2, 2016, now Pat. No. 10,859,121, which is a continuation of application No. 14/843,474, filed on Sep. 2, 2015, now abandoned.

(51) Int. Cl.

| | | |
|---|---|---|
| F16B 2/08 | (2006.01) | |
| F16C 19/52 | (2006.01) | |
| F16G 11/12 | (2006.01) | |
| F16G 11/14 | (2006.01) | |
| F16G 11/00 | (2006.01) | |
| F16C 33/60 | (2006.01) | |
| F16C 25/06 | (2006.01) | |
| F16C 25/00 | (2006.01) | |
| F16C 33/58 | (2006.01) | |
| F03D 80/70 | (2016.01) | |

(52) U.S. Cl.
CPC .............. *F16C 25/06* (2013.01); *F16C 33/58* (2013.01); *F16C 33/60* (2013.01); *F16G 11/00* (2013.01); *F16G 11/12* (2013.01); *F16G 11/14* (2013.01); *F03D 80/70* (2016.05); *F05B 2240/50* (2013.01); *F16C 33/586* (2013.01); *F16C 2300/14* (2013.01); *F16C 2360/31* (2013.01)

(58) Field of Classification Search
CPC .... F16C 2360/06; F16C 33/586; F16C 33/60; F16C 41/02; F16C 35/00; F16G 11/00; F16G 11/12; F16G 11/14
See application file for complete search history.

(56) References Cited

U.S. PATENT DOCUMENTS

| | | | |
|---|---|---|---|
| 3,669,433 A | 6/1972 | Hurst | |
| 3,953,911 A * | 5/1976 | Fishack | F16G 11/046 24/130 |
| 4,105,207 A | 8/1978 | Cooper et al. | |
| 4,128,921 A | 12/1978 | Heinze | |
| 4,200,345 A * | 4/1980 | Walker | B61C 17/08 384/150 |
| 4,229,138 A | 10/1980 | Hurst | |
| 4,678,147 A | 7/1987 | Barnes et al. | |
| 5,157,816 A * | 10/1992 | Huessler | F16L 23/08 24/283 |
| 10,859,121 B2 | 12/2020 | McNicols et al. | |
| 11,384,794 B2 | 7/2022 | McNichols et al. | |
| 11,384,795 B2 | 7/2022 | McNichols et al. | |
| 2003/0099510 A1 | 5/2003 | Huessler et al. | |
| 2007/0119165 A1 | 5/2007 | Yson et al. | |
| 2012/0279376 A1 | 11/2012 | Richards | |
| 2013/0068900 A1 | 3/2013 | Heath | |
| 2015/0035275 A1* | 2/2015 | Sudar | F16L 21/08 285/337 |
| 2015/0165596 A1* | 6/2015 | Andersen | F41H 11/05 24/68 BT |
| 2015/0219076 A1 | 8/2015 | Wendenberg et al. | |
| 2016/0039605 A1* | 2/2016 | Bowles | B65G 7/12 294/15 |
| 2016/0211574 A1 | 7/2016 | Dundorf et al. | |
| 2016/0286735 A1 | 10/2016 | Parrish | |
| 2017/0066385 A1 | 3/2017 | Dickinson | |
| 2017/0144484 A1 | 5/2017 | Colantoni et al. | |
| 2018/0003239 A1 | 1/2018 | McNicols et al. | |
| 2018/0042616 A1 | 2/2018 | Demas et al. | |
| 2018/0128247 A1 | 5/2018 | Pascual Resano et al. | |
| 2018/0245666 A1 | 8/2018 | Campbell | |
| 2019/0082795 A1 | 3/2019 | Rossi et al. | |
| 2019/0218006 A1 | 7/2019 | Matz | |

FOREIGN PATENT DOCUMENTS

| | | | |
|---|---|---|---|
| CN | 204512716 | 7/2015 | |
| CN | 206071803 | 4/2017 | |
| DE | 187412 | 10/1905 | |
| DE | 102004025682 A1 * | 12/2005 | ............. B29C 39/10 |
| DE | 102006046174 | 4/2008 | |
| DE | 102011012422 | 8/2012 | |
| DE | 102013214376 | 11/2014 | |
| EP | 008173 | 2/1980 | |
| EP | 0960986 | 12/1999 | |
| EP | 1876316 | 1/2008 | |
| EP | 2045464 | 8/2009 | |
| EP | 2574416 | 4/2013 | |
| GB | 1394625 | 5/1975 | |
| GB | 2165579 | 4/1986 | |
| JP | S52145665 | 12/1977 | |
| JP | S5325137 | 3/1978 | |
| JP | S55036181 | 3/1980 | |
| JP | S61124709 | 6/1986 | |
| JP | H07259826 | 10/1995 | |
| JP | H814391 | 1/1996 | |
| JP | H0814391 | 1/1996 | |
| JP | 2014163455 | 9/2014 | |
| JP | 2015034636 | 2/2015 | |
| JP | 2015034636 A * | 2/2015 | |
| WO | 2010/098716 | 9/2010 | |
| WO | 2021133985 | 7/2021 | |

OTHER PUBLICATIONS

Website: New Structures, Post-Tensioning—Isle of Grain, LNG Tanks, Kent, cited Jul. 29, 2020 from https://freyssinet.co.uk.
English translation of the Notice of Reasons for Refusal dated May 14, 2020 for corresponding Japanese Patent Application No. 2018-511424.
International Search Report dated Nov. 30, 2016 for corresponding International Application No. PCT/B2016/055266, filed Sep. 2, 2016.
Written Opinion of the International Searching Authority dated Nov. 30, 2016 for corresponding International Application No. PCT/IB2016/055266, filed Sep. 2, 2016.
Combined Search and Examination Report under Sections 17 & 18(3), dated Jul. 19, 2016 for corresponding GB Application No. 1611353.2.
Chinese Search Report dated Jan. 25, 2019 for corresponding Chinese Application No. 2016800506237.
English translation of the Chinese Office Action dated Feb. 2, 2019 for corresponding Chinese Application No. 2016800506237.
Chinese Office Action dated Feb. 2, 2019 for corresponding Chinese Application No. 2016800506237.

* cited by examiner

PRIOR ART

BEARING COMPRESSION STRAP

CROSS REFERENCE TO RELATED APPLICATIONS

This Application is a continuation of U.S. application Ser. No. 17/390,430, filed Jul. 30, 2021, now U.S. Pat. No. 11,384,795, which in turn is a continuation of U.S. application Ser. No. 17/090,546, filed Nov. 5, 2020, now U.S. Pat. No. 11,384,794, which is a continuation of U.S. application Ser. No. 15/757,095, filed Mar. 2, 2018, now U.S. Pat. No. 10,859,121, which claims priority to International Application No. PCT/IB2016/055266, filed Sep. 2, 2016, and published as WO 2017/037667 A1 in English on Mar. 9, 2017, which claims priority to U.S. application Ser. No. 14/843,474, filed Sep. 2, 2015, and to GB 1611353.2, filed in Great Britain on Jun. 30, 2016, the contents of each of which are incorporated herein by reference in their entireties.

TECHNICAL FIELD

The present invention relates to a bearing ring, and more particularly to a tensioning arrangement for a bearing ring. The arrangement provides a circumferentially distributed force towards the rotational centre of the bearing ring.

BACKGROUND ART

FIG. 1 shows a schematic of a typical bearing arrangement 10 having an outer bearing ring 12, a bearing race 14, and an inner bearing ring 16. Inner bearing ring is typically journaled to a shaft (not shown).

A problem with large bearings, is that the bearing ring 12 can distort as the shaft is loaded.

DISCLOSURE OF INVENTION

The present invention solves this problem by applying a circumferentially distributed force 18 towards a rotational centre of the bearing ring.

According to one aspect, the present invention provides a tensioning arrangement for a bearing ring comprising a strap and a tensioner. The strap comprises a connector at each end, and tensioner comprises means for connecting to the connectors. The tensioner also comprises means for applying tension to the strap. In use, the strap is arranged around the bearing ring and a circumferential length of the strap in contact with the bearing ring is reduced, thereby applying compressive force to the bearing ring.

BRIEF DESCRIPTION OF DRAWINGS

The present invention will now be described, by way of example only, with reference to the accompanying drawings in which.

BEST MODE FOR CARRYING OUT THE INVENTION

Figure 1A:
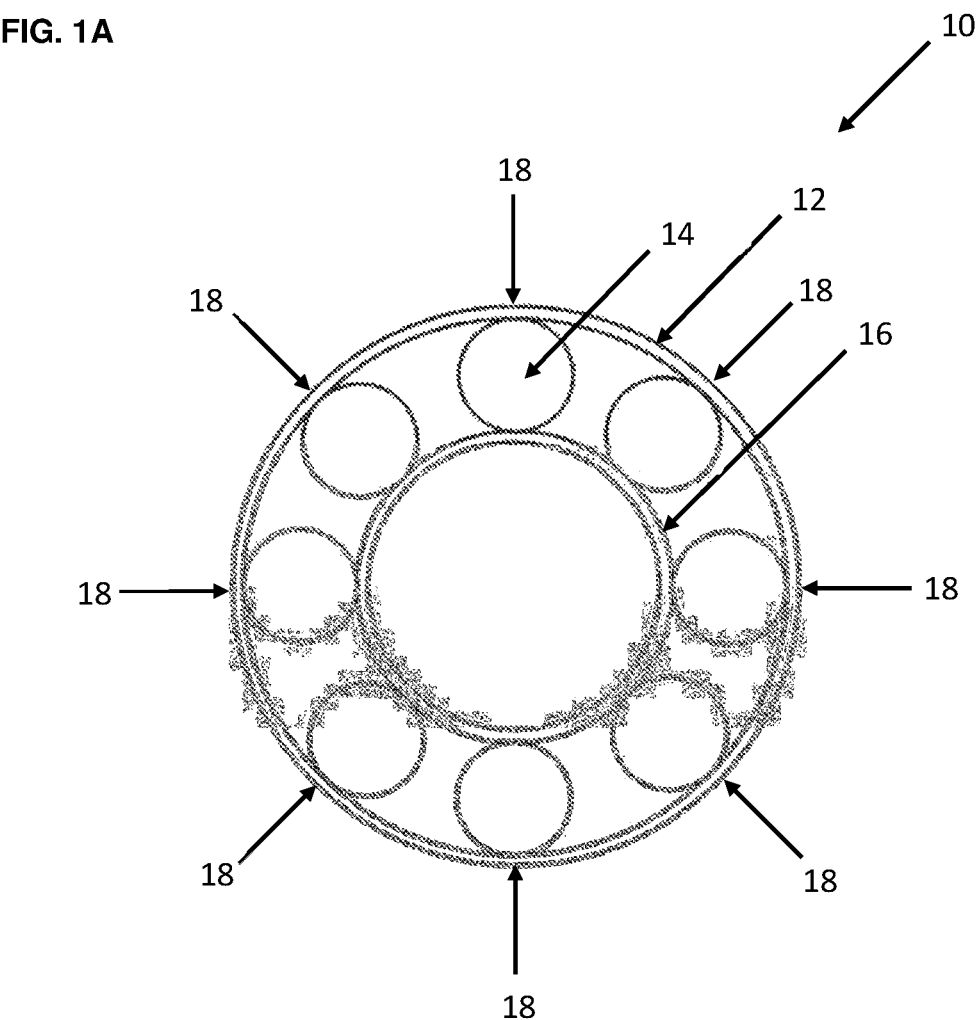
FIG. 1A shows a cross-section of a bearing arrangement.
Figure 1B:
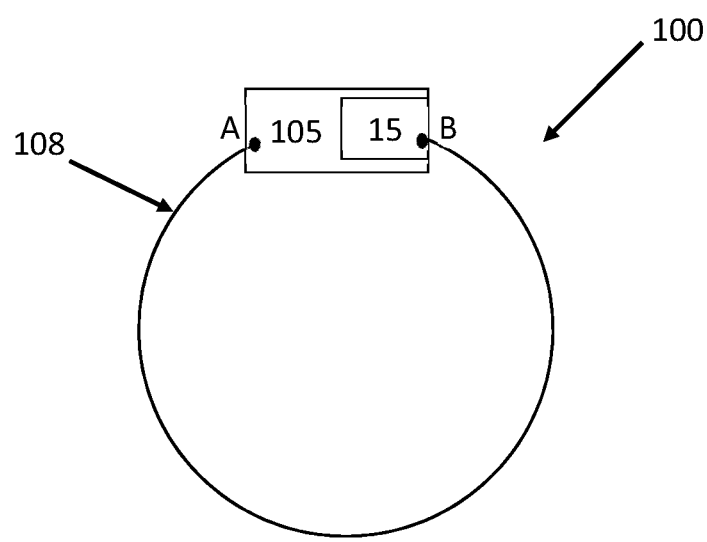
FIG. 1B shows a schematic of a bearing strap.

Referring now to FIG. 1B, which shows a conceptual schematic of a tensioning arrangement 100, first end A and second end B of a strap 108 are connected to a tensioner 105. The tensioner comprises means 15 for applying tension to the strap. One end B of the strap is connected to the tensioning means, and the tensioning means pulls end B into the tensioner 105 which shortens the strap. When the tensioning arrangement is arranged around a bearing ring (not shown), continued actuation of the tensioner tightens and stretches the strap and increases the tension in the strap 108 and hence introduces compressive force towards a rotational centre of the bearing ring. The tension introduced into the strap is dependent on the size of the bearing and its application: values are typically greater than 25 kN for smaller bearings, typically greater than 50 kN for medium size bearings and over 75 kN for large bearings.

Figure 2:
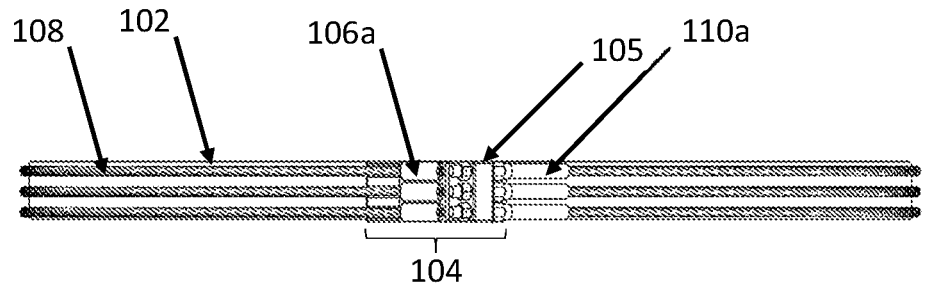
FIG. 2 is a plan view of a tensioning component for use on a bearing ring or other component housing a bearing.
Figure 3:
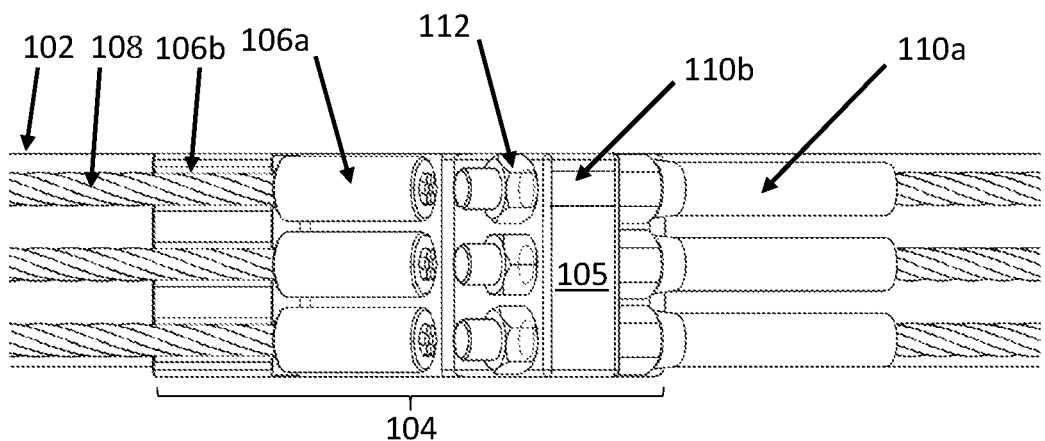
FIG. 3 is an enlarged plan view of FIG. 2.

Referring now to FIG. 2, which shows a tensioning arrangement for a bearing ring, a strap 108 is connected to a tensioner 105. The strap has a connector at or near each end, and in the example shown, the strap is a wire rope and the connectors comprise swaged studs or buttons 106a, 110a on the ends (A and B, respectively) of ropes 108. The stud 110a on one end (B) of the wire rope comprises a thread. The other stud 106a is plain with a larger diameter than the rope. These connect to the tensioner 105. Tensioner 105 comprises a mount plate 104. The tensioning arrangement is shown fitted to a bearing ring 102.

Figure 4:
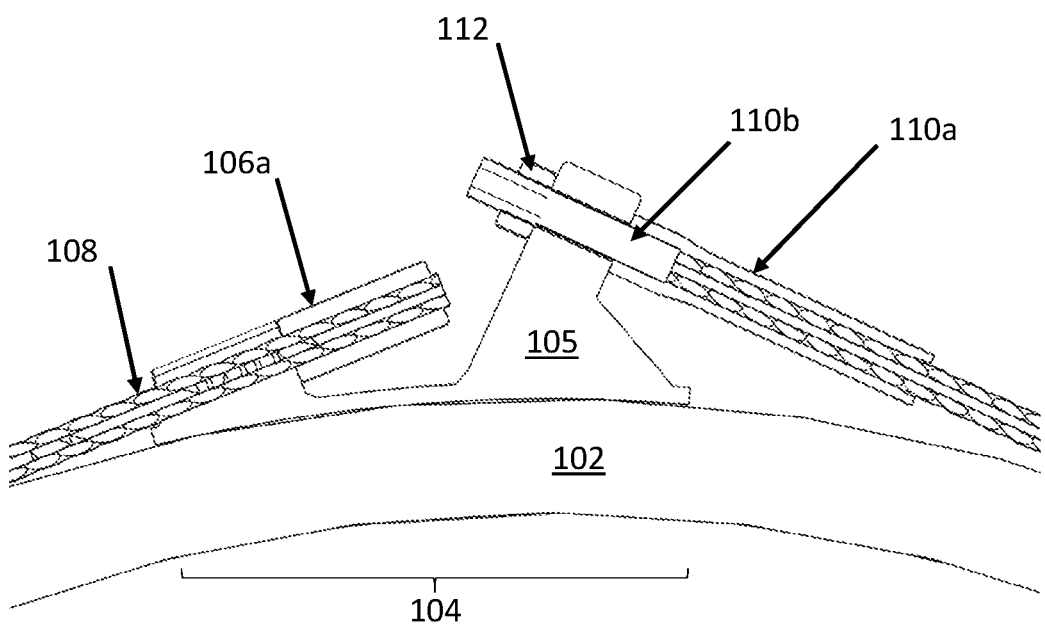
FIG. 4 is a close up isometric view of a strap component and a mounting component of FIG. 2.
Figure 5:
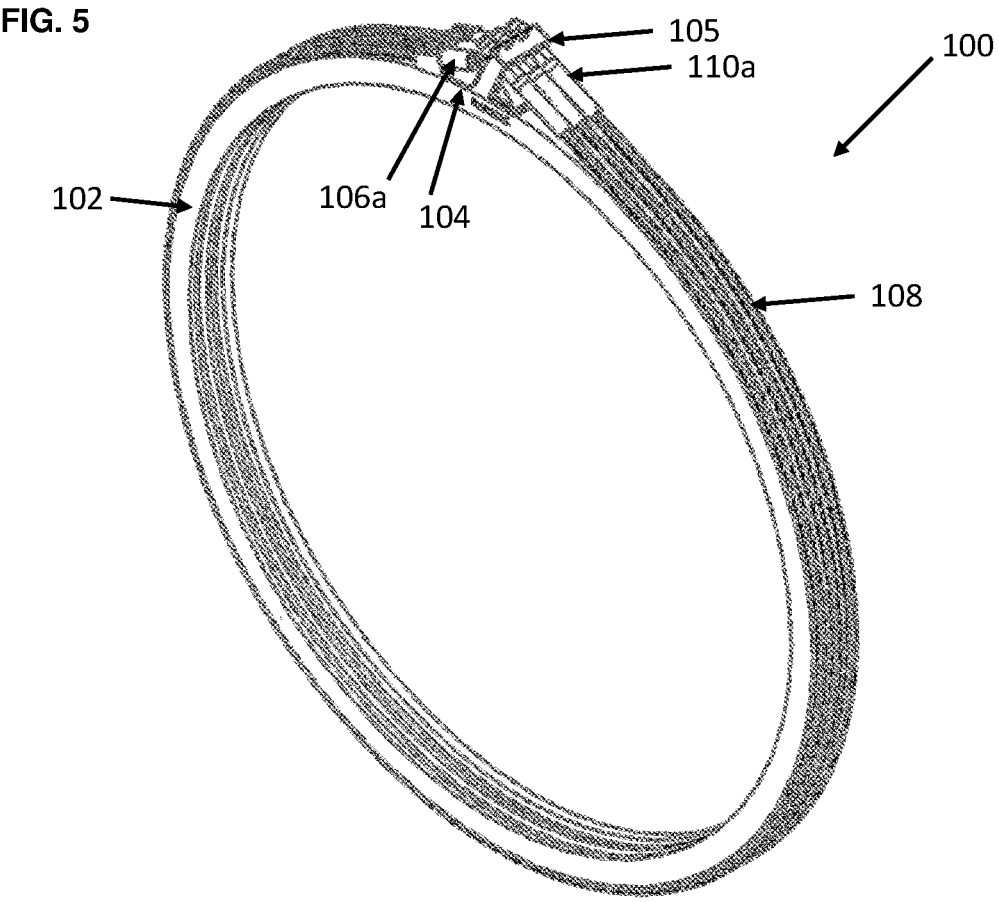
FIG. 5 is an enlarged plan view of a bearing compression strap fitted to a bearing ring.
Figure 6:
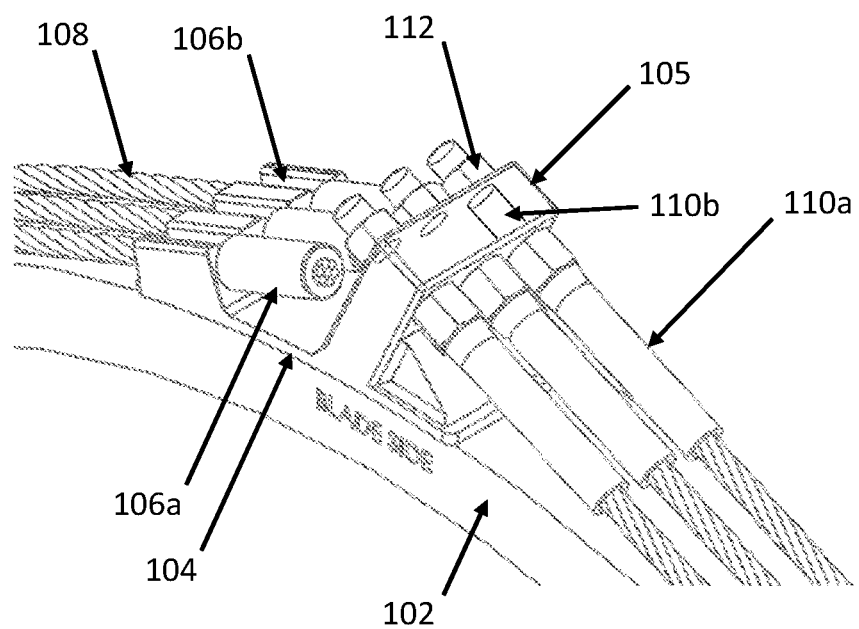
FIG. 6 is a close up isometric view of the connecting means and the tensioning means between the straps.
Figure 7:
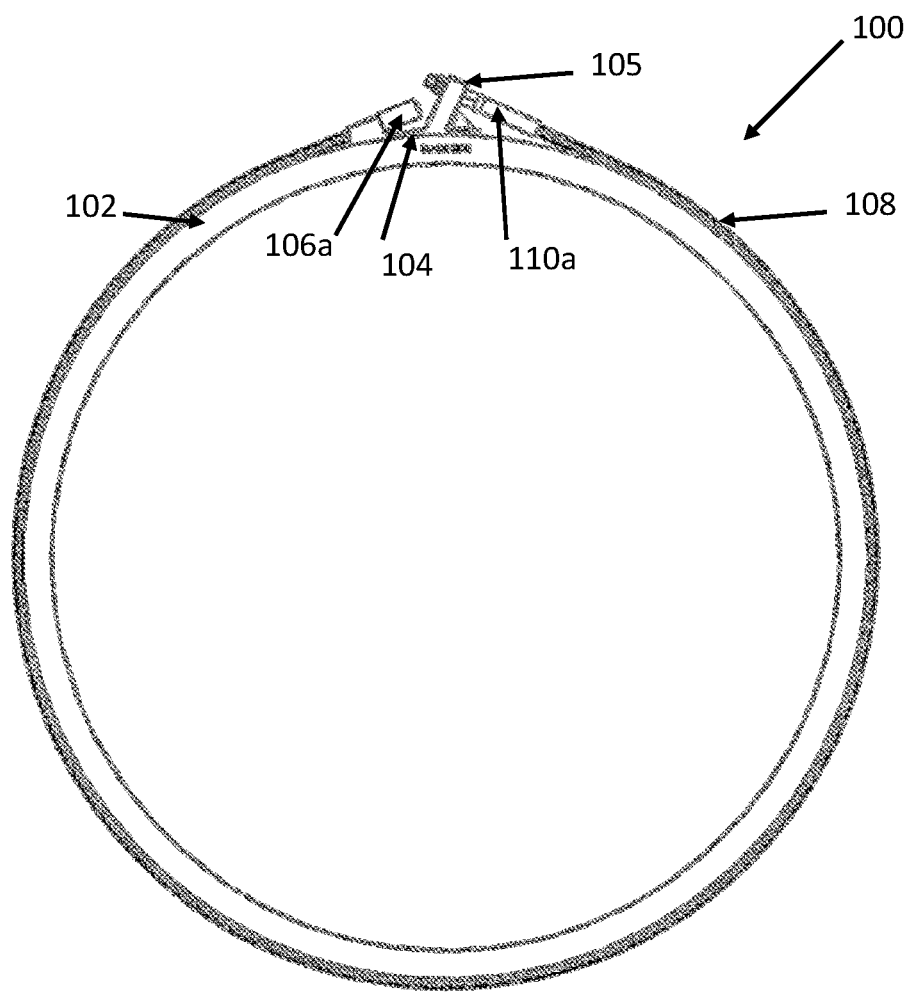
FIG. 7 is a front view of the bearing compression strap shown in FIG. 5.
Figure 8:
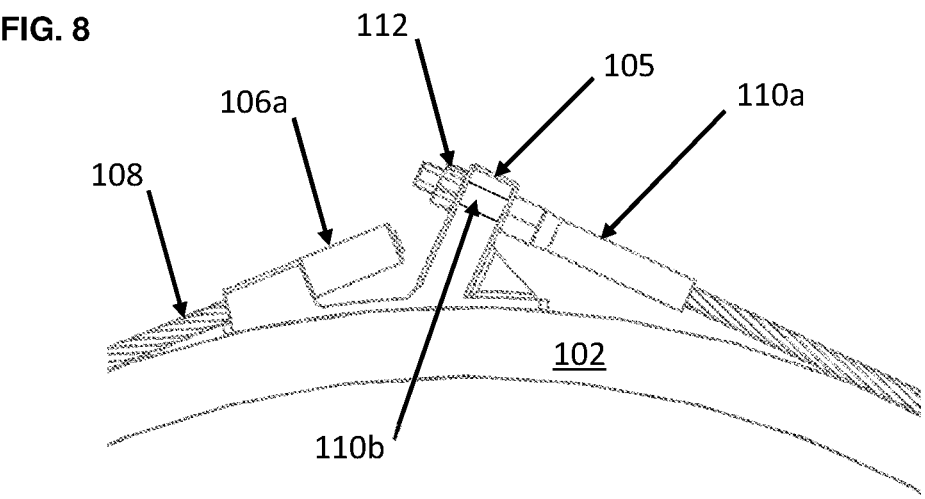
FIG. 8 is a close up front view of the connecting means and the tensioning means shown in FIG. 6.

Referring now to FIGS. 2 to 8, which show further views of the tensioning arrangement of FIG. 1, the end (A) of the strap component 108 comprising the plain stud 106a is anchored in slot 106b in mount plate 104. As can be seen in FIG. 4, the other end (B) of strap 108 passes through the outer part of the connector 110a. Tensioner 105 comprises a mount plate 104 which comprises a channel or hole 110b (shown as a dotted line) and the end (B) of the strap 108 comprising the threaded stud 110a passes through the channel 110b and is secured against the mount plate 104 by engaging with nut 112. The tensioner 105, comprising the threaded stud 110a, the mount plate 104 and the nut 112, operates to pull strap 108 through mount plate 104 as the nut is tightened. A separate tool typically tightens the nut thereby increasing the tension in the strap. As the strap is anchored at the other end (A) by connector 106a in slot 106b, this means that the length of the strap 108 arranged around the bearing ring 102 is reduced. Thus the tension in the rope 108 is increased and hence a compressive force towards the rotational centre of the bearing ring is increased. The compressive force is sufficient to prevent the bearing ring from distorting as the shaft is loaded. The mount plate 104 is designed to enable the use of bolt tensioning equipment to ease the tightening process Mount plate 104 can be in contact with bearing ring 102 in use.

Strap 100 is fitted to bearing ring 102, or a component housing a bearing ring. Bearing ring 102, or a component housing a bearing ring, is an existing component and is not part of the present invention. A tensioning force is applied to the strap which prevents the space provided by the bearing ring from being distorted in use.

In the example of the invention shown in FIGS. 2 to 8, the strap component 108 comprises one or more elements, such as the ropes shown, and these surround the circumference of the bearing ring 102 in use.

Furthermore, the connector 106a is shown as connecting to mount plate 104 via slot 106b. The skilled person will appreciate that the same overall effect would be achieved by directly and permanently connecting the mount plate to the one end of the strap 108.

Figure 9:
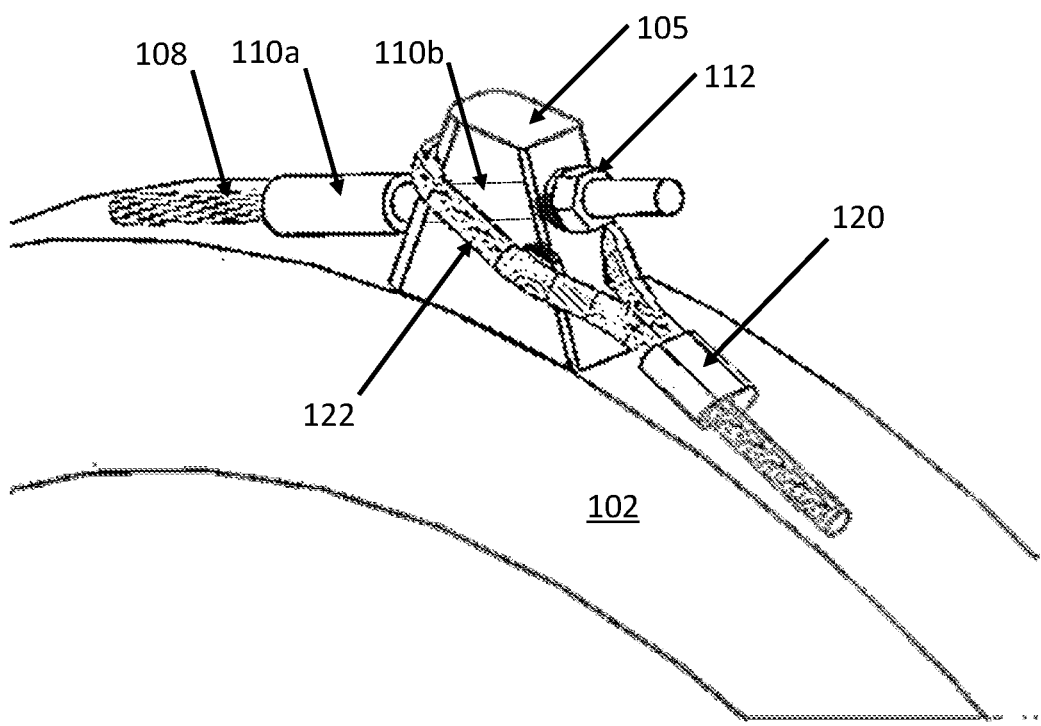
FIG. 9 is an isometric view of a strap component and connection means.
Figure 10:
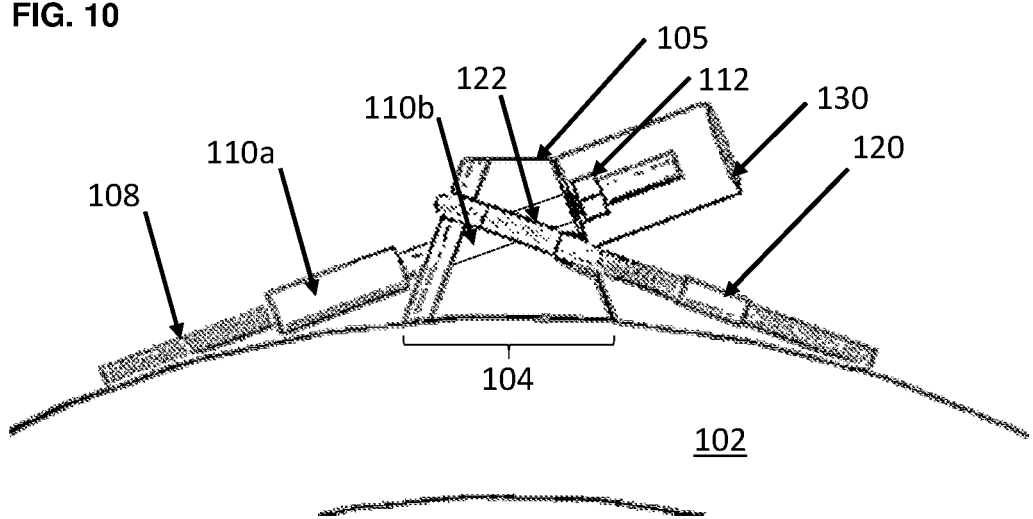
FIG. 10 is a side view of the strap component and connection means shown in FIG. 9.
Figure 11A:
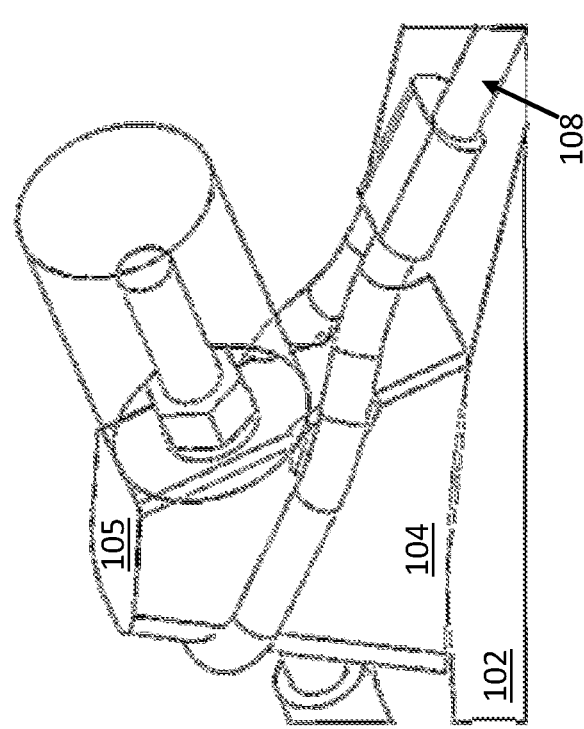
FIGS. 11A-D, which show channels 132, 134 and 136 formed in the mount plate shown in FIGS. 8 and 9.
Figure 11D:
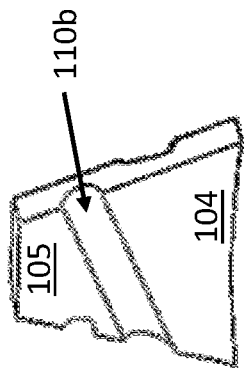
Figure 11C:
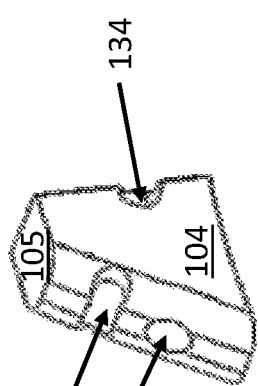
Figure 11B:
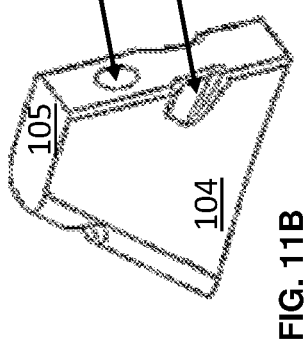

Referring now to FIGS. 9 and 10, which show a further example of tensioner arrangement in isometric and side view, respectively, a strap component 108 is connected to a tensioner 105. The strap component has a connector at each end, and in the example shown, the strap component comprises a swaged stud 110a on one end (B) of ropes 108 as described above. In this example, the connector at the other end (A) of strap component 108 is provided by loop 122 formed in the strap component in which the end of the strap component is looped and anchored to the strap component by an anchor 120. The loop 122 is mounted around mount plate 104 and is held in place by channels (see below). Mount plate 104 can be, in use, in contact with bearing ring 102. Also shown on this view is the envelope 130 a tensioning device would occupy during attachment of the strap assembly to the bearing. The strap is tensioned by tightening nut 112 as described above.

Referring now to FIGS. 11A-D, which shows further views of mount plate 104, channels 132, 134 and 136 are formed in tensioner 105 which serve to retain the strap component in place and also prevent damage to the strap by sharp edges in the tensioner when the strap component is tensioned. Channel 110b passes through tensioner 105, as shown in particular in FIG. 11D.

The strap 100 can be fitted before or after the bearing is attached to other machine components.

In the embodiment described, the tensioning arrangement is held in place against the bearing ring when tensioned; mounting means are not essential.

In a further embodiment the tensioning arrangement includes retainers to locate the rope on the circumference of the bearing ring. These serve to hold the mount plate if the strap components were to break, and further prevent the cables from falling away from the bearing ring.

Although strap component 108 as shown in the examples comprises a rope, other suitable strap components 108 can, for example, comprise a chain or a band.

Similarly, the means for applying tension can be, for example, comprised of ratchets or gearing.

Figure 12:
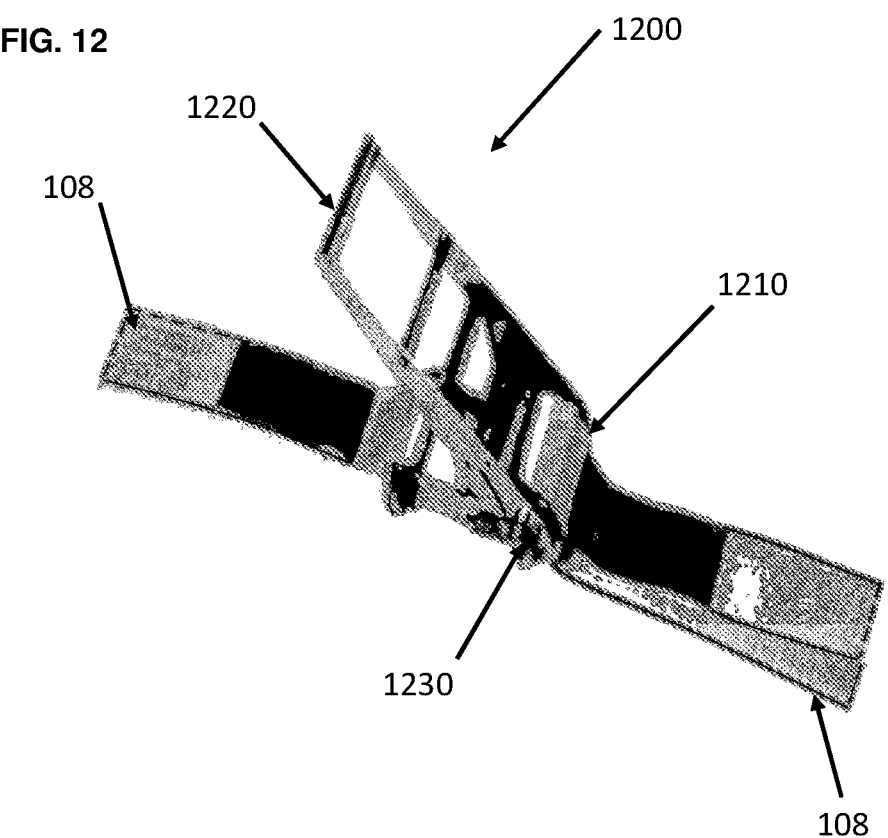
FIG. 12 shows an example of a ratchet tensioner.

Ratchet tensioners are well known, and a typical ratchet tensioner 1200 is shown in FIG. 12. It comprises a spool 1210, a ratchet and associated gears 1230 and a handle 1220, and is a mechanical device which is typically used to tighten straps 108.

Other strap/tensioner arrangements include hose clamps, T-bolt clamps, and straps having preformed holes and a buckle.

In a further example, a wind turbine bearing comprising the tensioning arrangement is disclosed. In particular the tensioner arrangement is engaged around the outer circumference of a blade pitch bearing located between the blades and the rotor hub, and held in place by a steel bracket 104. This introduces a compressive force onto the bearing which reduces tensile stresses within the bearing rings and improves pitch bearing life.

The invention claimed is:

1. A tensioning arrangement for a bearing ring comprising:
   a strap, in which said strap comprises a first connector at a first end and a second connector at a second end;
   a tensioner, in which said tensioner comprises:
      means for connecting to said connectors;
      means for applying tension to the strap; and
      a plurality of channels for receiving the first end of said strap;
   wherein, in use, the strap is connected to the tensioner and arranged around the bearing ring and actuation of the tensioner reduces a circumferential length of the strap in contact with the bearing ring and increases tension in the strap, thereby applying compressive force to a rotational centre of the bearing ring sufficient to prevent the bearing ring from distorting.

2. The tensioning arrangement of claim 1 in which said first connector comprises a stud.

3. The tensioning arrangement of claim 1 in which said second connector comprises a threaded stud.

4. The tensioning arrangement of claim 1 in which said first connector comprises a loop.

5. The tensioning arrangement of claim 4 in which said loop is formed from the strap.

6. The tensioning arrangement of claim 1 in which said one of said connectors is a direct connection to said tensioner.

7. The tensioning arrangement of claim 1 in which said connector comprises a threaded stud and in which said threaded stud is secured to said tensioner by a nut.

8. The tensioning arrangement of claim 7 in which said means for applying tension comprises tightening said nut to increase tension in said strap.

9. The tensioning arrangement of claim 1 in which said first connector comprises a loop and in which said loop is mounted on said channels.

10. The tensioning arrangement of claim 9 in which said second connector comprises a threaded member and in which said threaded member is secured to said tensioner by a nut.

11. The tensioning arrangement of claim 10 in which said means for applying tension comprises tightening said nut to increase tension in said strap.

12. The tensioning arrangement of claim 1 in which said means for applying tension comprises a thread and nut arrangement.

13. The tensioning arrangement of claim 1 in which said means for applying tension comprises a gearing arrangement.

14. The tensioning arrangement of claim 1 in which said means for applying tension comprises a ratchet arrangement.

15. The tensioning arrangement of claim 1 in which said means for applying tension comprises a hydraulic arrangement.

16. The tensioning arrangement of claim 1 in which said strap comprises one or more of a rope, a chain or a band.

* * * * *